United States Patent [19]

Katsuma et al.

[11] 4,448,509
[45] May 15, 1984

[54] INTERCHANGEABLE LENS BARREL WITH SIGNAL TRANSFER CONTACTS

[75] Inventors: Makoto Katsuma, Kanagawa; Shigeru Kamata, Tokyo; Syuichiro Saito, Kanagawa; Masaharu Kawamura, Kanagawa; Akira Akashi, Kanagawa, all of Japan

[73] Assignee: Canon Kabushiki Kaisha, Tokyo, Japan

[21] Appl. No.: 416,136

[22] Filed: Sep. 9, 1982

[30] Foreign Application Priority Data

Oct. 26, 1981 [JP] Japan .......................... 56-171237[U]
Oct. 26, 1981 [JP] Japan ................................ 56-171238
Oct. 26, 1981 [JP] Japan .......................... 56-159528[U]

[51] Int. Cl.³ ...................... G03B 17/00; G03B 17/14
[52] U.S. Cl. ................................ 354/286; 354/289.1; 350/257
[58] Field of Search ........................ 354/46, 286, 289; 350/257

[56] References Cited

U.S. PATENT DOCUMENTS 4,104,649  8/1978  Tanaka et al. ...................... 354/286
4,118,713  10/1978  Murakami et al. ................ 354/286
4,357,089  11/1982  Okura et al. ....................... 354/286
4,372,663  2/1983  Oshima .............................. 354/286

Primary Examiner—A. A. Mathews
Attorney, Agent, or Firm—Toren, McGeady and Stanger

[57] ABSTRACT

An interchangeable lens barrel includes connection terminals on a part of the lens barrel for sending and receiving electrical signals to and from a photographic apparatus. The lens barrel part is provided with a mechanism for protecting the connection terminals by covering the terminals when the lens barrel is removed from the photographic apparatus. When the lens barrel is mounted on the photographic apparatus, the protecting mechanism is retracted from the terminals to allow for connection with corresponding terminals on the photographic apparatus.

5 Claims, 14 Drawing Figures

INTERCHANGEABLE LENS BARREL WITH SIGNAL TRANSFER CONTACTS

BACKGROUND OF THE INVENTION

1. Field of the Invention

This invention relates to an interchangeable lens barrel for a photographic camera or a like optical apparatus.

2. Description of the Prior Art

During recent years, there have been proposed electromagnetic diaphragm aperture control devices of the type using electromagnetic energy for electrically controlling the diaphragm device of a lens barrel. There have been also provided diaphragm devices of the type using a stepping motor or a linear motor for controlling the aperture thereof with the driving force of the motor. These electric diaphragm devices are arranged to open and control the diaphragm aperture with an electromagnetic device or a motor by supplying a lens barrel with either a digital electrical signal or an analog electrical signal from a camera body. Conversely, in another type of the conventional electric diaphragm devices, an exposure control mechanism provided within the camera body is controlled with a digital or analog electrical signal by supplying the signal from a diaphragm device disposed within the lens barrel to the inside of the camera body.

The position of the above stated electrical signal sending and receiving means, such as an electrical contact of a lens barrel which is arranged to send and receive electrical signals, is inevitably limited by the arrangement required for attaching and detaching the lens barrel to and from the camera body, and also by the arrangement required for a glass optical system. This limitation has compelled the electrical signal sending and receiving means to be disposed either at a lens barrel mounting arrangement or in the vicinity thereof. Such being the position of the electrical contacts which are disposed on the side of the lens barrel, the electrical contacts tend to become insufficiently electrically connected with corresponding electrical contacts disposed on the side of the camera body, either because of oxidation due to dust or moisture in the air or because of grease on the finger of the operator. It is thus quite possible that the camera will malfunction because of insufficient contact by the electrical contacts. The same problem also exists in an intermediate tube or an extension inserted in between the camera body and the lens barrel, and also in other accessories to be mounted and operated on the camera.

SUMMARY OF THE INVENTION

The first object of this invention is to provide a device which ensures safety of the signal sending and receiving operation of electrical signal sending-and-receiving means of the type arranged in a lens barrel or in an optical apparatus such as a photographic camera, as mentioned in the foregoing.

Another object of the invention is to provide a lens barrel or a camera having covering means which automatically covers the electrical signal sending-and-receiving means when a lens barrel or a camera is detached from a camera, a like photographic apparatus, or from a lens barrel in such a manner that the electrical signal sending-and-receiving means is not exposed to the outside and is protected from dust, moisture, grease, etc. when the lens barrel is in a state of being detached from the camera.

A further object of the invention is to provide a lens barrel in which the above covering means which covers the electrical signal sending-and-receiving means is automatically removed when the camera or the lens barrel is mounted on the lens barrel or the camera, and is arranged to permit the connection of the electrical signal sending-and-receiving means to be effected between the lens barrel and the photographic apparatus by a lens barrel mounting operation carried out on the photographic apparatus in a conventionally known manner.

These and further objects and features of this invention will become apparent from the following detailed description of the preferred embodiments thereof taken in connection with the accompanying drawings.

DETAILED DESCRIPTION OF PREFERRED EMBODIMENTS

The accompanying drawings show embodiment examples of the present invention. Since the safety device of a lens barrel according to the invention is applicable also to a camera body and other associated accessories such as an intermediate tube, etc., application of the invention to a camera body is omitted from the following description. Such other applications would be apparent to one skilled in the art in view of the following disclosure.

Figures 1A, 1B:
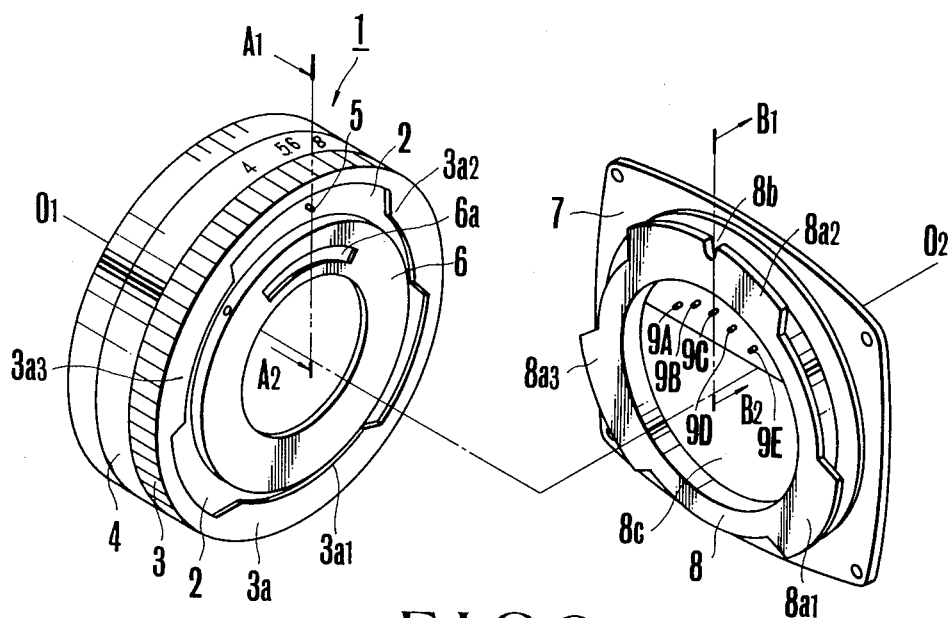
FIGS. 1A and 1B are oblique views showing a lens barrel and a mount of a camera arranged in accordance with the invention.
Figure 2:
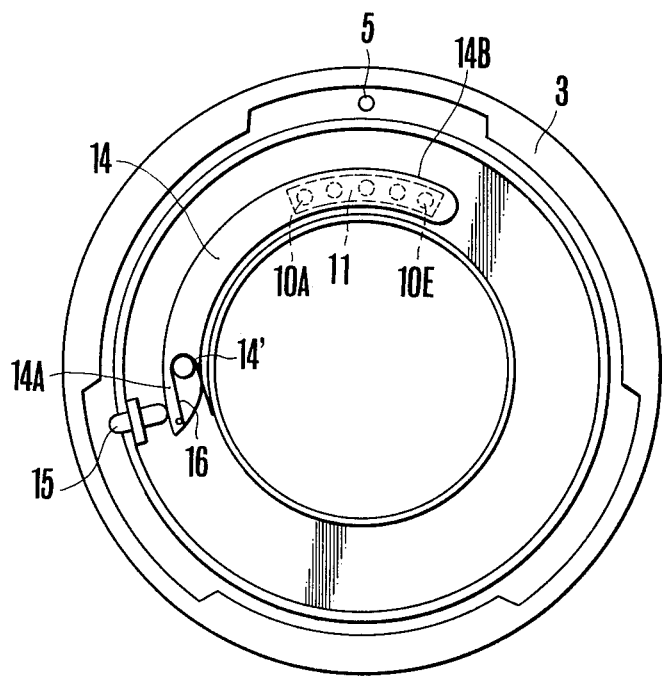
FIG. 2 is a front view showing the lens barrel 1 in a state of having a lid member 6 removed therefrom and electrical contacts 10A–10E covered by a cover member 14.

Referring to FIGS. 1 through 5 which show an embodiment of the invention, a lens barrel 1 which is shown in its entirety in FIG. 1A includes a fixed lens barrel having an end face 2 thereof shown in an exposed state in FIG. 1A; and a bayonet tightening ring 3 which is rotatable, on an optical axis $O_1$, relative to the fixed lens barrel 2 and is arranged not to pull out from the fixed lens barrel 2. The bayonet tightening ring 3 includes a bayonet member 3a. The member 3a is provided with bayonet claws 3a1-3a3 which are arranged to be coupled with the bayonet member of the camera body when the lens barrel 1 is mounted on the camera. The fixed lens barrel 2 has an aperture setting ring fitted thereon; and a positioning pin 5 which is provided on the fixed lens barrel 2 for coupling the lens barrel and the camera in their predetermined relative positions. The lens barrel 1 is provided further with a lid member 6 which covers the end face of the fixed lens barrel and has electrical contacts arranged on the inner side thereof as shown in FIG. 2. The lid member 6 is provided with a slot 6a.

In FIG. 1B which shows a mount part attached to the front of the camera body which is not shown, a bayonet mount member 8 is carried by a support plate 7, which is secured to the camera body. The bayonet mount member 8 is provided with bayonet claws 8a1, which are arranged to be coupled with the bayonet claws of the bayonet mount 3a arranged on the lens barrel side. Electrical signal contacts 9A-9E are disposed on the support plate 7, on the side of the camera body. The electrical signal contacts 9A-9E are arranged to be brought into contact with the electrical signal contacts of the lens barrel side when the tightening ring 3 is turned after the bayonet claws are fitted into corresponding bayonet notches respectively.

Figure 3:
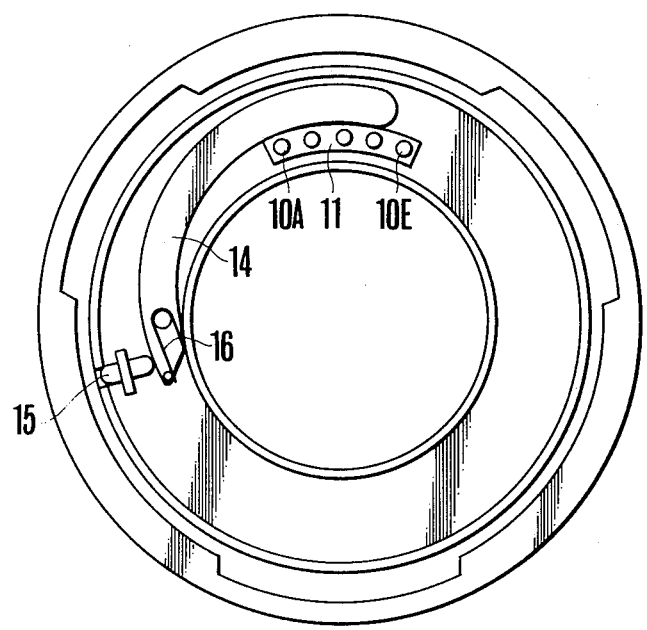
FIG. 3 is a front view showing the lens barrel 1 in a state of having the cover member 14 retracted.
Figure 4A:
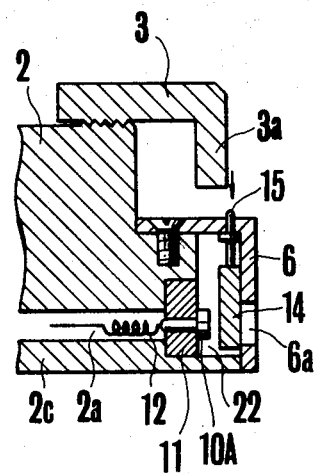
FIG. 4A is a sectional view taken on line A1–A2 of FIG. 1A.

A safety device which is arranged to cover electrical signal contacts is as shown in FIGS. 2 and 3, which respectively represent the front view of the lens barrel 1. FIG. 2 shows the lens barrel 1 as in a state of having been detached from the camera body, while FIG. 3 shows it in a state of having been attached to the camera body. In both cases of FIGS. 2 and 3, the lid member 6 which is shown in FIG. 1A is removed from the lens barrel 1. Referring to FIGS. 2 and 3, the electrical signal contacts 10A-10E provided on the lens barrel side are attached to the fixed lens barrel 2. Each of the electrical signal contacts 10A is secured to an electrically insulating plate 11 which is stuck to a peripheral part of an opening 2a formed in the fixed lens barrel 2 as shown in FIG. 4A and is connected through a conductor 12 to a motor, a motor control circuit or an electric or electromagnetic diaphragm device which is not shown. Again referring to FIGS. 2 and 3, a cover member 14 is pivotally attached at one end 14A to the fixed lens barrel 2 and is arranged to be rotatable on a shaft 14'. The other end portion 14B of cover member 14 is arranged to cover the electric contacts 10A-10E. Urging means which consists of an operation pin 15 and a spring member 16 is provided at the end 14A of the cover member 14. The urging means is arranged to cause the cover member 14 to cover the electric contacts 10A-10E when the lens barrel 1 is either detached from the camera body or in a detached state, and to withdraw from these contacts 10A-10E when the lens barrel 1 is either mounted on the camera or in a mounted state. The spring member 16 is arranged at the pivoted end 14A of the cover member 14 to urge the cover member 14 to turn clockwise on the shaft 14'. Meanwhile a piercing hole is provided through a part 2b of the fixed lens barrel 2. One end of the operation pin 15 is arranged to protrude to the outside through this piercing hole while the other end of the pin 15 is engaged with the end of the cover member 14 in such a way as to counteract the urging force of the spring member 16.

Figure 4B:
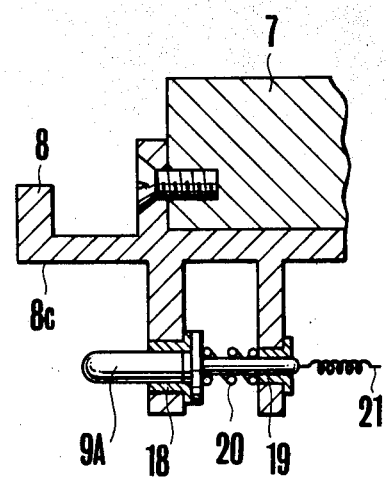
FIG. 4B a sectional view taken on line B1–B2 of FIG. 1B.
Figure 5:
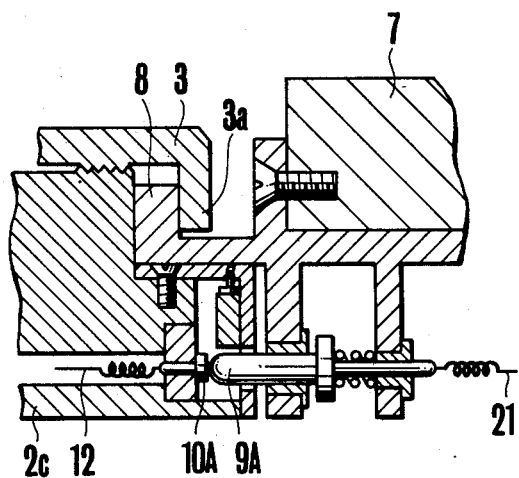
FIG. 5 is a sectional view showing the essential parts of the mounts of the lens barrel and the camera body as in a coupled state and thus showing the action of the cover member.

Electrical contact arrangement on the side of the camera body is as shown in FIG. 4B which is a sectional view taken on line B1-B2 of FIG. 1. The electrical contacts 9A-9E on the side of the camera body are arranged at the mount member 8 of the camera body with holes formed in parts 8b and 8c of the mount member 8. The contacts 9A-9E are protected by electrical insulating members 18 and 19 and connected to a conductor 21 with an urging force of a coil spring 20 exerted thereon.

The safety arrangement described in the foregoing operates in the following manner: When the lens barrel 1 is in a detached state, the cover member 14 receives the force of the spring member 16 which urges the member 14 to turn clockwise on the shaft 14'. Under this condition, one end 14B of the cover member 14 covers the slot 6a in front of the electrical signal contacts 10A-10E disposed on the lens barrel side.

In coupling the bayonet mounts of the lens barrel and the camera body for mounting the lens barrel on the camera body, an inner part 8c of the ring of the bayonet mount member 8 disposed on the camera body side pushes the head of the operation pin 15 in the direction of arrow. This causes the cover member 14 to turn counterclockwise on the shaft 14' to have one end 14B of the cover member 14 retracted from the front of the electrical signal contacts of the lens side.

Then, the lens mounting operation is performed by interlocking the bayonet mount member of the lens barrel and the camera body and by turning the tightening ring 3 disposed on the side of the lens barrel. The electrical contacts 9A-9E of the camera body then come into contact with the electrical contacts 10A-10E of the lens barrel through the slot 6a provided in the lid member 6 of the lens barrel.

In detaching the lens barrel 1 from the camera body, the spring 16 brings the operation pin 15 back to the condition as shown in FIG. 4A when the bayonet mount member 8 pulls out. Then, the cover member 14 again covers the slot 6a of the lid member 6 to protect the electrical signal contacts 10A-10E.

The provision of the cover member according to the invention thus protects the electrical signal contacts of the lens barrel side or the camera body side from dust, water, grease, etc. to ensure a high degree of reliability as to the continuity of the contacts between the camera body and the lens barrel. The invention is therefore advantageous for an electrically controlled photographic system consisting of a lens and a camera.

In the structural arrangement of the lens barrel of the embodiment described in the foregoing, the electrical contacts 10A-10E are disposed within a closed space formed by the fixed lens barrel 2 and 2c and the lid member 6. Their contact with the electrical contacts or electrical signal terminals 9A-9E on the camera body side is allowed only through the slot 6a. The structural arrangement is therefore highly suitable for preventing the intrusion of dust, water and grease or the like from outside of the lens barrel and thus provides the most effective protection for the electrical contacts.

While the embodiment has been described by way of example of application of the invention to the relation of camera to an interchangeable lens, the invention is of course not limited to such an application but also applicable to an intermediate tube extender, a removable filter device or a liquid crystal device, a motor drive unit, a flash device unit, etc.

In the case of an electrically controlled lens barrel of the type to which the embodiment described above belongs, electrical signals such as a power source voltage signal, signals representative of information on the maximum and minimum aperture values, on a manually set aperture value and, in the case of an automatic focusing lens-and-camera system, a nearest distance signal, an in-focus detection signal, a signal for controlling the movement of a focusing lens and other electrical signals for display of such information must be sent and received to and from the camera body. This necessitates provision of electrical signal sending-and-receiving means such as electrical contacts on the lens barrel.

It is conceivable that, in a lens barrel provided with transferring or sending-and-receiving means for many electrical signals as mentioned above, some inconveniences might be incurred from the differences between these electrical signals in their nature and in electrical unit. In case all the electrical signals are arranged to be voltage signals, for example, the voltage value of the power source voltage signal which is produced from the camera body, for a motor driving device within the lens barrel, greatly differs from that of another signal, such as a maximum aperture value signal or an aperture setting signal. Then, an excessive voltage or current will be impressed on or supplied to an electrical circuit disposed on the lens side or on the camera side, when the terminal disposed on the camera body side for the power source voltage signal comes into contact with a terminal disposed on the lens side for the maximum aperture value signal or the aperture setting value signal. The impression or supply of such an excessive voltage or current then results in a serious problem such as breakage of a circuit, accuracy degradation of a circuit output or the like. Nowadays, the mounts of almost all lens-and-camera systems are of the type arranged to mount the lens by turning it round its optical axis (including a screw mount arrangement and a bayonet mount arrangement). It is particularly important for these mounts to solve the above stated problem. In the above stated rotating type mounting device, the mount member on the lens side and the mount member on the camera side are arranged to abut upon each other or engage with each other and to have their screw or bayonet coupling parts coupled by rotating them relative to each other. Such being the mounting arrangement, if the electrical signal contacts or terminals mentioned above are arranged in a position close to the relative rotation between the lens and the camera, the power source voltage signal terminal disposed on the side of the camera or camera body might come into contact with other electrical signal terminals disposed on the lens side to cause some inconvenience thereby.

Figure 7:
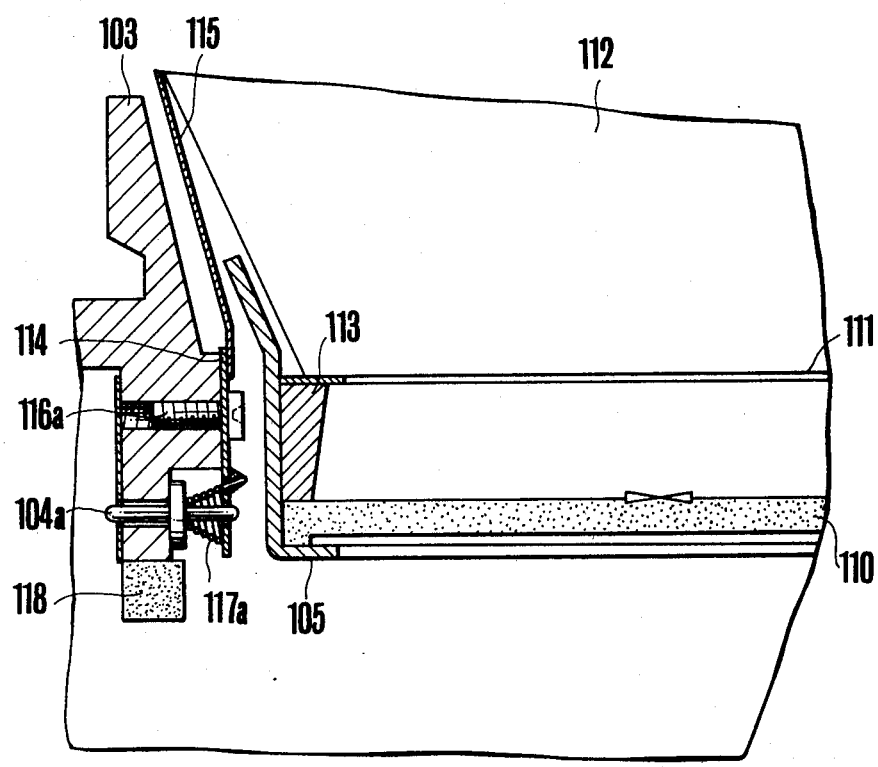
FIG. 7 is an enlarged sectional view showing the essential parts disposed on the camera side.
Figure 8:
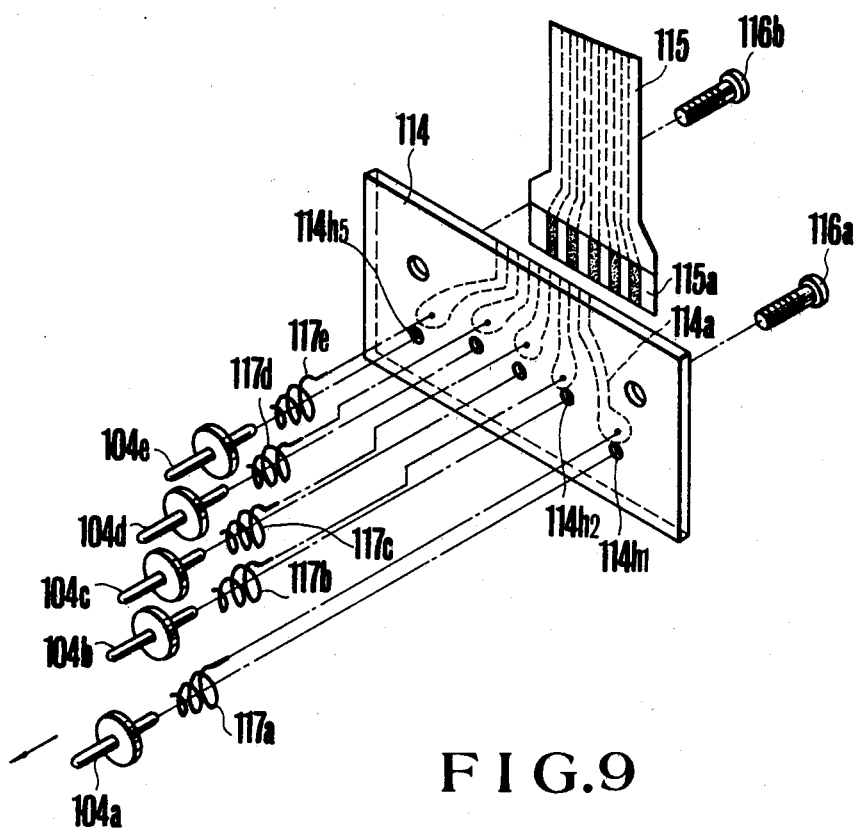
FIG. 8 is an exploded view showing the structural arrangement of the contact terminals on the camera side.

This problem is solved by a second embodiment of the invention. Referring to FIGS. 6-9, the second embodiment is arranged as follows:

A reference numeral 100 denotes a camera body. A mount member 102 which, in this case, is a bayonet type mount member is secured to the camera body 100. A base plate member 103 is secured to the camera body 100 or the mount member 102. As shown in FIG. 7 in a sectional view, there are provided electrical signal terminals 104a, 104b, 104c, 104d and 104e which are arranged in parallel on the side of the camera body. Referring to FIGS. 7 and 8, the arrangement of the electrical signal terminals on the camera body side is as follows: The camera body is provided with a penta-prism retaining frame 105 which is secured to the camera body; a focusing glass 110; a field mask 111; a penta-prism 112; and a spacer 113. Since the arrangement of these parts is known, they will be omitted from the description herein. The electrical signal contacts or terminals 104a-104e are carried by an electrical circuit substrate 114. The substrate 114 is provided with a copper foil pattern parts 114a-114e which are arranged to contact with a conduction terminal which will be described hereinafter. A reference numeral 115 denotes a flexible substrate which is provided for electrical connection between the circuit substrate 114 and an electrical control circuit which is not shown. One end 115a of the flexible substrate 115 is soldered to the circuit substrate 114. The substrate 114 is secured to the base plate 103 with screws 116a and 116b.

Each of the electric signal terminals 104a-104e on the side of the camera body is urged in the direction of arrow by one of conductive coil springs 117a-117e which are disposed between the base plate 103 and the circuit substrate 114. One end of each of the conductive coil springs 117a-117e pierces through one of holes 114h1-114h5 formed in the substrate 114 and is soldered to one of the copper foil pattern parts 114a-114e disposed on the opposite side of the substrate.

A mirror 119 is arranged to be received by a Moltoprene member 118 which is stuck to the lower part of the base plate 103.

Figure 6A:
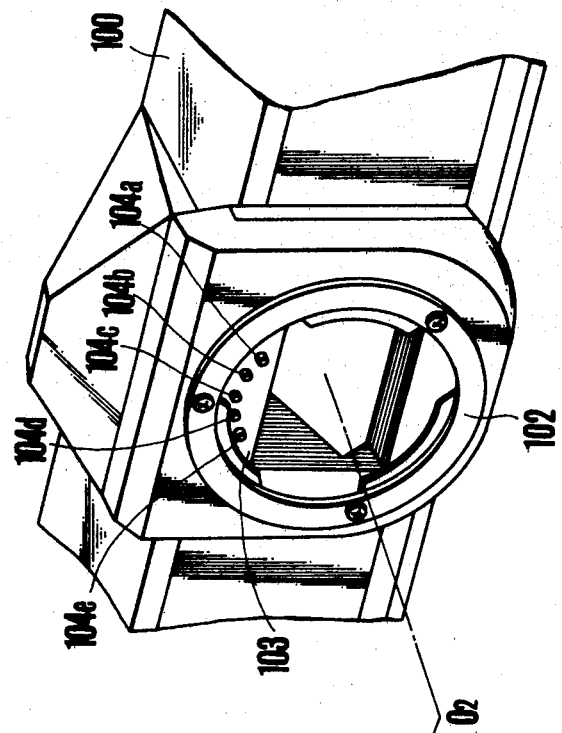
FIGS. 6A and 6B are oblique views of essential parts of another embodiment showing the arrangement of contact terminals on the camera side and the lens side.
Figure 6B:
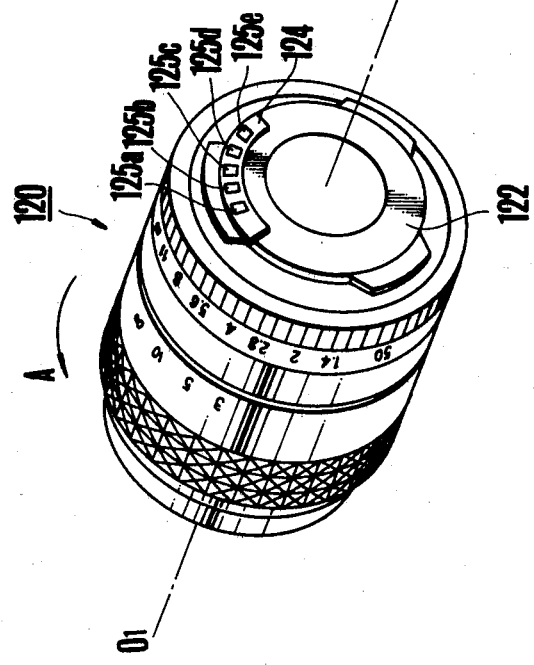
Figure 9:
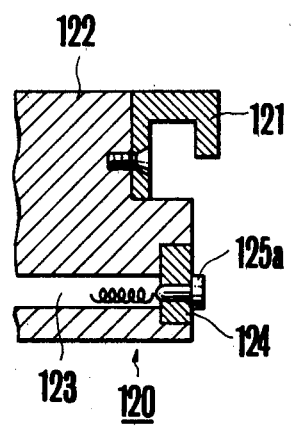
FIG. 9 is a sectional view showing the structural arrangement of the contact terminals on the lens side.

Referring now to FIGS. 6B and 9, the electrical signal terminals on the lens barrel side are arranged as follows: A reference numeral 120 denotes the lens barrel. The lens barrel 120 is provided with a bayonet member 121 which is arranged to be coupled with the bayonet member 102 of the camera body and is connected to a fixed lens barrel 122 into one unified body therewith. The fixed lens barrel 122 is provided with either a plurality of holes or an arcuate slot 123 arranged round the optical axis of the lens barrel. An electrical insulation plate 124 is stuck to the holes or slot 123. The electric insulation plate 124 has the electrical signal terminals 125a-125e arranged thereon in positions corresponding to the electrical signal terminals 104a-104e. One end of each of the terminals 125a-125e has one of conductors 126a-126e connected thereto. Meanwhile, the conductors 126a-126e are connected to driving means such as a motor or the like and a control circuit which are not shown.

In this embodiment, a power supply voltage source is disposed on the side of the camera body and the power source voltage is arranged to be supplied through the signal terminals 104a and 104e and the signal terminals 125a and 125e. The terminals 104e and 125e are used as grounding terminals. The lens barrel and the camera body are coupled by turning the lens barrel round the optical axis 01-02 thereof in the direction of arrow. Other information signals such as a maximum aperture value information signal, a set aperture value information signal and a movable lens control information signal are arranged to be transferred between the terminals 104c, 104d and 104e and terminals 125c, 125d and 125e.

With the embodiment arranged as described above, the grounding terminal 104e on the camera body side first comes into contact with the terminal 125a on the lens barrel side when the lens barrel is turned in the direction of arrow with the bayonet member of the lens barrel and that of the camera body joined together. Then, the grounding terminal 104e comes into contact with other terminals 125b, 125c and 125d of the lens barrel in succession and is connected to the grounding terminal 125e of the lens barrel when the lens barrel mounting operation is completed. The contact terminal 104d which is arranged on the side of the camera body to serve for the maximum aperture value information comes into contact with the terminals 125a, 125b and 125c of the lens barrel and then is connected to the contact terminal 125d which is arranged on the side of the lens barrel for the maximum aperture value information. Following that, the contact terminal 104c of the camera body is connected to the corresponding contact terminal 125c of the lens barrel after contacting with the contact terminals 125a and 125b of the lens barrel.

The electrical contact terminals which are provided on the camera body side and on the lens barrel side for the purpose of supplying the power source voltage are thus arranged to be connected to their corresponding terminals either immediately before or concurrently with completion of the lens barrel mounting operation. This arrangement effectively precludes the occurrence of the inconvenience mentioned in the foregoing.

In the above description of the embodiment, the power source voltage is arranged to be supplied from the camera body to the lens barrel. However, it is also conceivable to conversely arrange the power source voltage to be supplied from the lens barrel to the camera body. In such a case, the contact terminal of the supplying side is arranged to be connected to the corresponding contact terminal of the receiving side also immediately before or concurrently with completion of a lens barrel mounting operation or after the signal terminals which are disposed in parallel therewith.

Figure 10A:
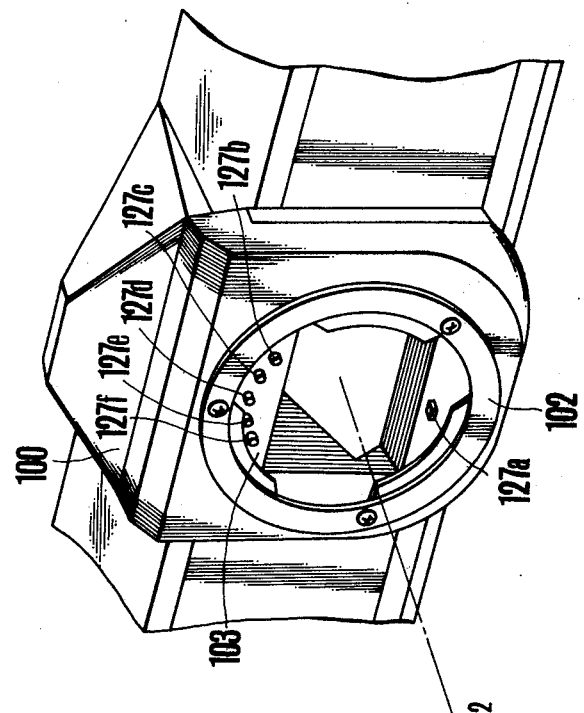
FIGS. 10A and B are oblique views showing contact terminals arranged on the camera and lens sides as a further embodiment of the invention.
Figure 10B:
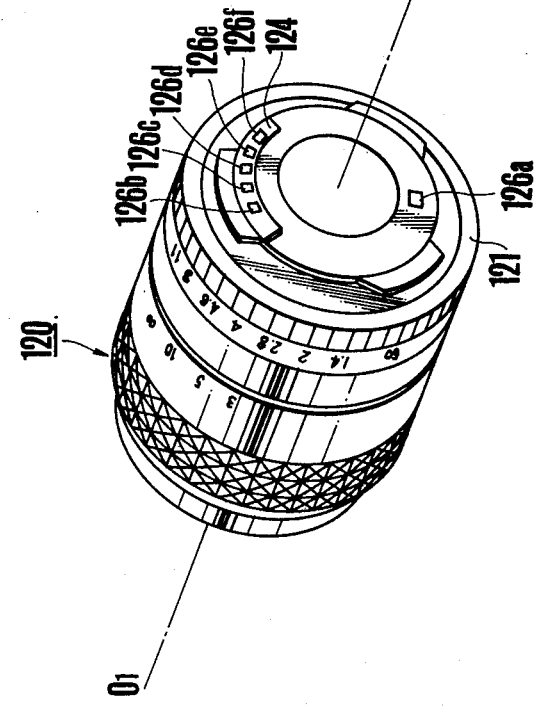

FIGS. 10A and 10B show a further embodiment of the invention. The parts of this embodiment that are identical with those of the preceding embodiment shown in FIGS. 6 to 9 are indicated by the same reference numerals as those used in FIGS. 6 to 9. Among the electrical signal contact terminals shown in FIGS. 10A and 10B, terminals 126f and 127f are arranged to serve as grounding terminals. Power supplying and receiving terminals 127a and 126a are arranged in positions away from information signal contact terminals. The power supply contact terminal can be thus arranged not to come into contact with the contact terminals arranged on the other side during a lens barrel mounting operation on the camera body.

What we claim:

1. An interchangeable lens barrel, comprising:
   (a) signal transfer means for transferring signals between a part of the interchangeable lens barrel and an imaging apparatus, and coupling means arranged to permit said part of the interchangeable lens barrel to be attached to and detached from the imaging apparatus; and
   (b) a protection member for protecting said signal transfer means, said protection member being arranged to cover the signal transfer means when said part of the interchangeable lens barrel is detached from the imaging apparatus, and to be retracted away from the signal transfer means when said part of the interchangeable lens barrel is mounted on the imaging apparatus.

2. An interchangeable lens barrel according to claim 1, further including:
   an operation member for operating said protection member, wherein said operation member pushes the protection member to retract the protection member away from said signal transfer means when said part of the interchangeable lens barrel is mounted on the imaging apparatus.

3. An interchangeable lens barrel according to claim 2, further including:
   an inserting member on said part of the interchangeable lens barrel and arranged to have a portion thereof inserted into an opening provided in a mount member disposed on the side of the imaging apparatus when said part of the interchangeable lens barrel is mounted on the imaging apparatus, said protection member being arranged to be actuated by the insertion of the inserting member into the opening of the mount member of said imaging apparatus.

4. An interchangeable lens barrel, comprising:
   (a) a lens barrel member having an optical axis and a generally flat end surface, said lens barrel member being arranged to be mounted on a photographic apparatus in a predetermined position in a state fixed from rotation about the optical axis relative to the photographic apparatus;
   (b) an insulation member on said end surface of said lens barrel member and a plurality of electrical signal terminals mounted on said lens barrel member through said insulation member, wherein said signal terminals are arranged along an arc which is concentric with the lens barrel member; and
   (c) a lid member for covering said generally flat end surface of said lens barrel member and having an opening part for allowing the electrical signal terminals to be connected to corresponding electrical signal terminals arranged on the side of the photographic apparatus.

5. An interchangeable lens barrel according to claim 4, further including:
   (a) means including said lens barrel member and said lid member for forming at least a partly annular space about the optical axis of said lens barrel member; and
   (b) a cover member arranged within said annular space to cover said opening part of the lid member, said cover member being arranged to selectively open and close said opening part according to attaching and detaching operations of said interchangeable lens barrel with respect to said photographic apparatus.

* * * * *